United States Patent [19]
Yaegashi et al.
[11] 4,389,996
[45] Jun. 28, 1983

[54] METHOD AND APPARATUS FOR ELECTRONICALLY CONTROLLING FUEL INJECTION

[75] Inventors: Takehisa Yaegashi, Mishima; Yukio Kinugasa, Susono, both of Japan

[73] Assignee: Toyota Jidosha Kogyo Kabushiki Kaisha, Toyota, Japan

[21] Appl. No.: 260,844

[22] Filed: May 5, 1981

[30] Foreign Application Priority Data

Dec. 9, 1980 [JP] Japan ................................ 55-172630

[51] Int. Cl.[3] ........................ F02D 9/02; G05B 15/02; F02D 1/04; F02M 25/06

[52] U.S. Cl. .................................... 123/491; 123/585; 123/478; 123/339; 123/486

[58] Field of Search ............... 123/491, 585, 588, 339, 123/478, 486

[56] References Cited

U.S. PATENT DOCUMENTS 4,005,689 2/1977 Barnard ................................ 123/585
4,203,395 5/1980 Grovnas et al. ..................... 123/585
4,280,471 7/1981 Maraki ................................ 123/585
4,289,100 9/1981 Kinagawa et al. .................. 123/585
4,291,656 9/1981 Miyagi et al. ........................ 123/339
4,300,501 11/1981 Suzuki ................................ 123/585
4,306,527 12/1981 Kinagawa et al. .................. 123/339
4,310,888 1/1982 Furihashi et al. .................. 123/491
4,329,951 5/1982 Seilly .................................. 123/491

*Primary Examiner*—Raymond A. Nelli
*Attorney, Agent, or Firm*—Cushman, Darby & Cushman

[57] ABSTRACT

A method of electronically controlling fuel injection in an engine including a bypass line running in parallel to the portion of an intake passage in which a throttle valve is provided. The communicable cross sectional area of the bypass line is controlled so as to maintain the idling speed of an engine at a predetermined desired value. When the engine temperature is higher than a predetermined value, the engine is idling and the communicable cross sectional area of the bypass line is being controlled, a value is stored related to the mean value of the flow rate of intake air or the mean amount of fuel being injected into the engine. When the engine is later being started, when the engine temperature is lower than a predetermined value, or when the engine is accelerating while the engine temperature is yet lower than a predetermined value, the amount of fuel to be injected is calculated by using the value thus stored as a parameter to compensate for internal friction in the engine.

16 Claims, 8 Drawing Figures

METHOD AND APPARATUS FOR ELECTRONICALLY CONTROLLING FUEL INJECTION

BACKGROUND OF THE INVENTION

1. Field of the Invention

This invention relates to a method of and apparatus for electronically controlling fuel injection in an engine.

2. Description of the Prior Art

In a conventional method for electronically controlling fuel injection, the amount of fuel being injected while the engine is starting, while the engine is warming-up (The engine temperature is lower than a predetermined value), and during acceleration while the engine is warming-up, is calculated without using a feedback signal from an air-fuel ratio sensor for detecting the actual air-fuel ratio of the intake mixture from the concentration of oxygen in exhaust gases. Stated otherwise, it has been a common practice to control the fuel injection valve during these evens open loop. Engine characteristics change as parts of an engine suffer wear. Despite this fact, in a conventional method of electronically controlling fuel injection, the amount of fuel being injected during starting of an engine, warm-up, and acceleration during warm-up has been calculated without using the extent of engine wear as a parameter. When a new car is delivered to a user, the engine must be run, and hence, the engine suffers wear. Thus, at the delivery of a new car, large frictional forces develop, impairing the operational performance of the engine. Furthermore, the amount of harmful constituents being released from the engine increases after the break-in of a new car just manufactured, or after the new car has been run until the progress in the wear of engine becomes reasonably slow.

SUMMARY OF THE INVENTION

It is, accordingly, an object of the present invention to provide a method of and apparatus for electronically controlling fuel injection, wherein good performance of an engine is maintained even during starting, warm-up, and acceleration during warm-up, irrespective of whether the frictional losses are large or small. At the same time, the amount of harmful constituents being released from the engine are reduced.

To attain the object, there is provided according to the present invention a fuel injection valve controlled by electric pulses for injecting fuel into an intake system. A bypass line runs in parallel to a portion of an intake passage in which a throttle valve is provided interconnected to an accelerator pedal. The throttle valve controls the communicable cross sectional area of the intake passage. A control valve in the bypass line controls the communicable cross sectional area of the bypass line. The amount of fuel that should be injected as well as the amount of air that should be supplied to the engine are calculated from operational parameters of the engine so that, the fuel injection valve as well as the control valve are controlled. A value related to either the mean value of the intake air flow rate while the engine temperature is higher than a predetermined value, the engine is idling and the control valve is controlling the air flow rate in the bypass line to provide a desired running speed of an engine, or the mean value of the amount of fuel that has been injected is stored. Then this value thus stored is used as a parameter to determine the amount of fuel to be injected when the engine is restarted, when the engine temperature is lower than a predetermined value, or when an engine is accelerating while the engine temperature is lower than a predetermined value.

The aforesaid mean value of the intake air flow rate or the aforesaid mean value of the amount of fuel being injected changes with the progress of wear of various parts of the engine. For this reason, there is stored a value corresponding to the aforesaid mean value of the intake air flow rate, or a value corresponding to the aforesaid mean value of the amount of fuel being injected. When the engine is restarted, or the engine is warm-up or the engine is accelerating during warm-up, the amount of fuel to be injected is calculated by using the value stored as a parameter, so that the amount of fuel being injected at these times may be decreased with the progress of wear of various parts of the engine. Also the output of the engine may be maintained at a predetermined value to ensure the stabilized running of the engine during break-in while it is new. Finally, the amount of harmful constituents being released from the engine after termination of the break-in period may be decreased.

The amount of fuel being injected when the engine temperature is elevated above a predetermined value is calculated by using an air-fuel ratio feedback signal as a parameter, and the amount of fuel being injected when the engine is restarted and the engine temperature is lower than a predetermined value is calculated without using the air-fuel ratio feedback signal as a parameter.

The value to be stored may correspond to a mean value of a pulse width of a fuel-injection pulse generated while the engine temperature is higher than a predetermined value, the engine is at an idle, and the opening of the control valve is calculated by using a running speed of the engine as a parameter.

When the engine is restarted, a predetermined basic injection timing is corrected by the value stored, and the amount of fuel being injected may be calculated by using the correction result as a parameter.

A first function may be defined whose value decreases as an engine temperature rises. The first function is corrected by the value stored, thereby obtaining a first reference fuel increase coefficient. The amount of fuel being injected during warm-up is calculated by using the first reference fuel increase coefficient as a parameter.

A second function may also be defined whose value decreases as an engine temperature is elevated. The second function is corrected by the value stored, thereby obtaining a second reference fuel increase coefficient. The amount of fuel being injected when the engine accelerates during warm-up is calculated by using the first and second reference fuel increase coefficients as a parameter.

DESCRIPTION OF THE PREFERRED EMBODIMENTS

Figure 1:
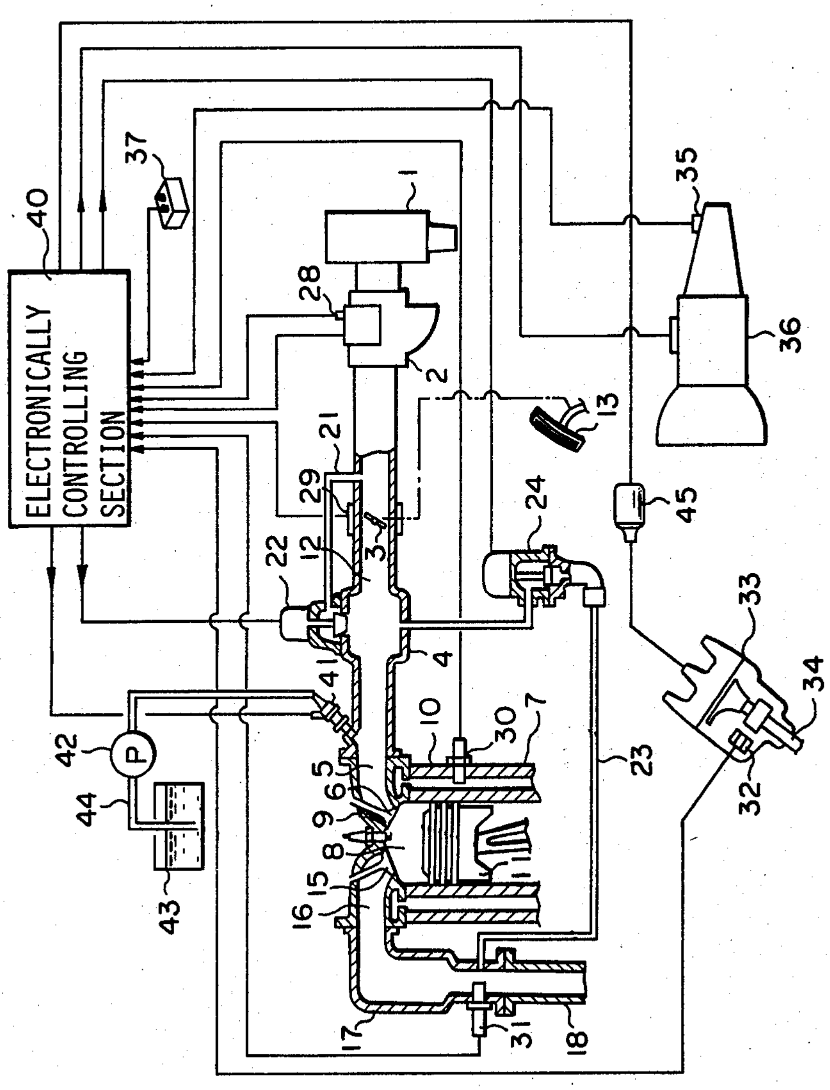
FIG. 1 is a schematic block diagram of an electronic fuel injection control device to which the method of the present invention is to be applied.

Air drawn under suction from an air cleaner 1 is fed by way of an intake passage 12 including an air flow meter 2, a throttle valve 3, a surge tank 4, an intake port 5 and an intake valve 6 into a combustion chamber 8 in an engine body 7. The throttle valve 3 is interconnected to an accelerator pedal 13 in a driver's compartment. The combustion chamber 8 is defined by a cylinder head 9, a cylinder block 10 and a piston 11. Exhaust gases resulting from combustion of an air-fuel mixture are released by way of an exhaust valve 15, an exhaust port 16, an exhaust manifold 17 and an exhaust pipe 18 to the atmosphere. A bypass line 21 connects the intake passage upstream of the throttle valve 3 to the surge tank 4. A bypass flow-rate control valve 22 may be electrically operated, such as an electromagnetic flow-rate control valve (a solenoid valve), to thereby control the communicable cross sectional area of the bypass line 21. An exhaust gas recirculating line 23 interconnects the exhaust manifold 17 with the surge tank 4. An on-off type, recirculating exhaust gas control valve 24 is adapted to open and close the exhaust gas recirculating line 23 in response to electric pulses. An intake air sensor 28 is provided within the air flow meter 2 so as to detect the intake air temperature. A throttle position sensor 29 detects whether the throttle valve 3 is in the idling position, or not. A coolant temperature sensor 30 is attached to the cylinder block 10, so as to detect the temperature of cooling water, related to the engine temperature. An air-fuel ratio sensor 31, known as a sensor for detecting a concentration of oxygen, is attached to the assembly portion of the exhaust manifold 17, so as to detect a concentration of oxygen in the assembly portion of the manifold. A crank angle sensor 32 detects the crank angle of the crank shaft from the rotation of a shaft 34 for a distributor 33 which is connected to the crank shaft (not shown) of the engine body 7. A car-speed sensor 35 detects the rotational speed of an output shaft of a transmission 36. Outputs of these sensors 2, 28, 29, 30, 31, 32 and 35 and the voltage of a battery 37 are transmitted to an electronic controlling section 40. A fuel injection valve 41 is provided in the vicinity of the intake port 5 in an opposed relation to the cylinder 10. Pump 42 supplies a fuel from a fuel tank 43 via a fuel line 44 into the fuel injection valve 41. The electronic controlling section calculates the amount of fuel to be injected by using input signals from the respective sensors as a parameter, and transmits to the fuel injection valve 41 electric pulses of a pulse width corresponding to the amount of fuel to be injected. The electronic controlling section 40 also controls the control valve 22, the EGR control valve 24, a solenoid valve 44 (FIG. 2) in an oil pressure control circuit in the automatic transmission and an ignition coil 45. The secondary side of the ignition coil 45 is connected to the distributor 33.

Figure 2:
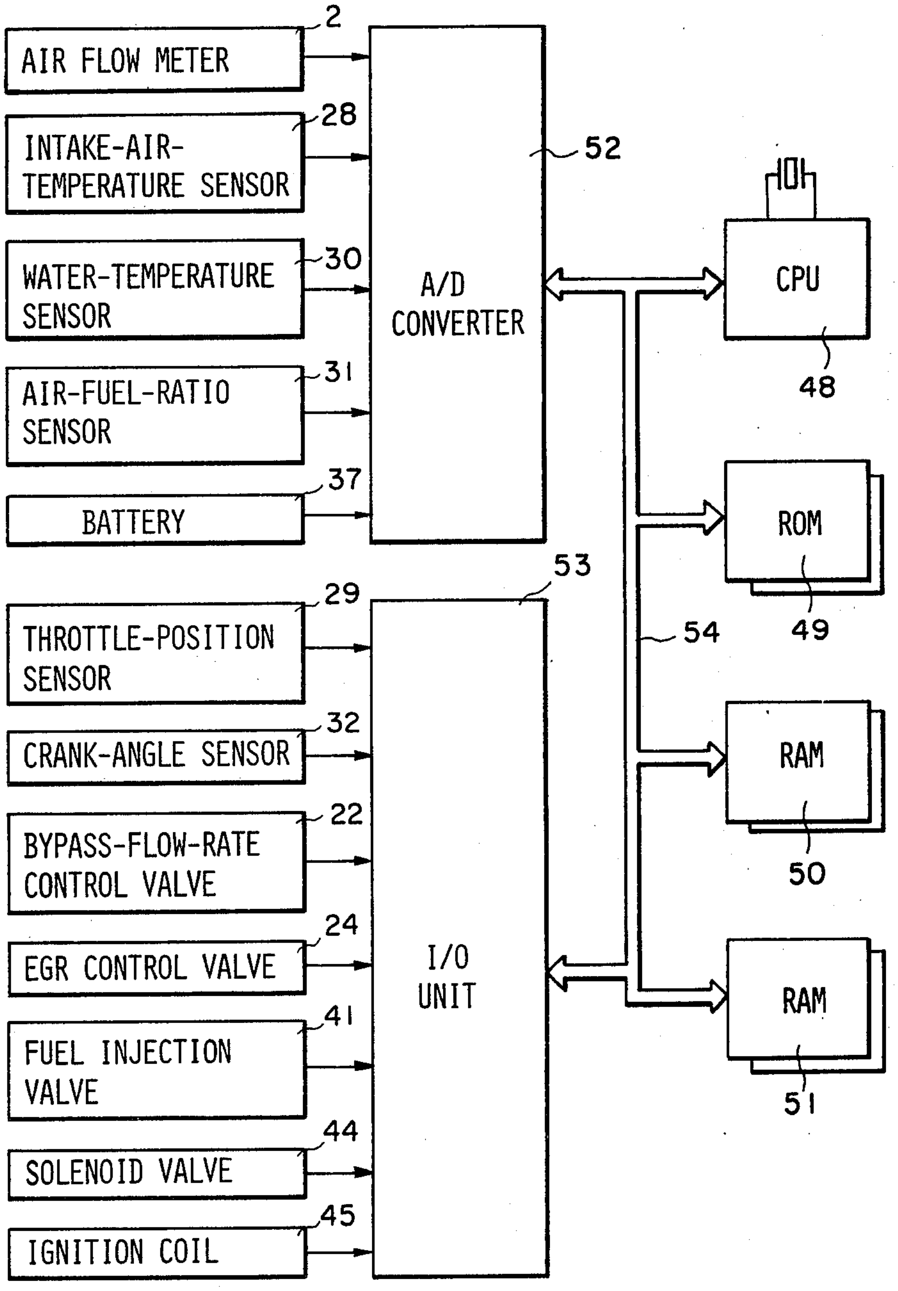
FIG. 2 is a block diagram of an electronic controlling section of FIG. 1.

Referring to FIG. 2 wherein the electronic controlling section 40 is illustrated in detail, there are provided a central processing unit (CPU) 48 consisting of a microprocessor, a read only memory 49, a random access memory 50, another random access memory 51 adapted to retain its contents even when the engine is off by being supplied with current from an auxiliary power source, an A/D converter with multiplexer 52, and an input/output unit 53 with a buffer, all of which are interconnected by a bus 54. The RAM 51 may be a non-volatile memory. The outputs of the air flow meter 2, the intake air sensor 28, the coolant sensor 30, the air-fuel ratio sensor 31 and the battery 37 are transmitted to the A/D converter 52. The outputs of the throttle position sensor 29 and the crank angle sensor 32 are transmitted to the I/O unit 53. The bypass flow-rate control valve 22, the EGR control valve 24, the fuel injection valve 41, the solenoid valve 44 and the ignition coil 45 receive the inputs from the CPU 48 via I/O unit 53.

Figure 3:
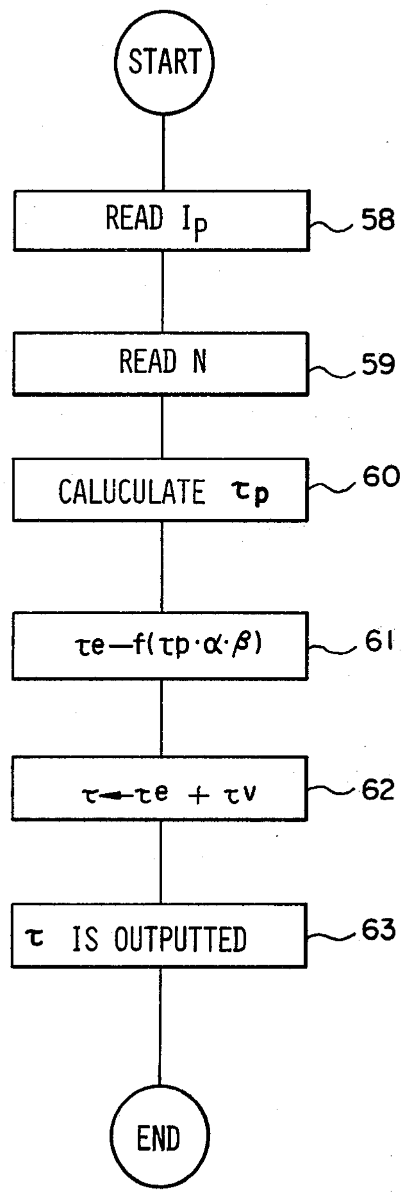
FIG. 3 is a flow chart of the program of calculation of the amount of fuel being injected when the engine is warm.

FIG. 3 is a flow chart of the program for calculating the amount of fuel to be injected under feedback control of signals from the air-fuel ratio sensor 31 as a parameter, when the engine temperature is higher than a predetermined value, namely, after the engine is warmed up. At steps 58 and 59, the intake pipe negative pressure Ip, stored in the RAM 50, or the intake air flow rate Q and a running speed N of the engine are read. At a step 60, a basic fuel injection time $\tau p$ is obtained from the data according to a known calculation program stored at the ROM beforehand. At a step 61, $f(\tau p.\alpha.\beta)$ is calculated from a correction coefficient $\alpha$ based on the feedback signals from the air-fuel ratio sensor 31, another correction coefficient $\beta$ and $\tau p$. The effective fuel injection time $\tau e = f(\tau p.\alpha.\beta)$ is thus obtained. At a step 62, a final fuel injection time $\tau = \tau p + \tau v$ is calculated from the effective injection time $\tau e$ and an ineffective fuel injection time $\tau v$ of the fuel injection valve 41, and at a step 63, $\tau$ is transmitted to the I/O unit 53.

Figure 4:
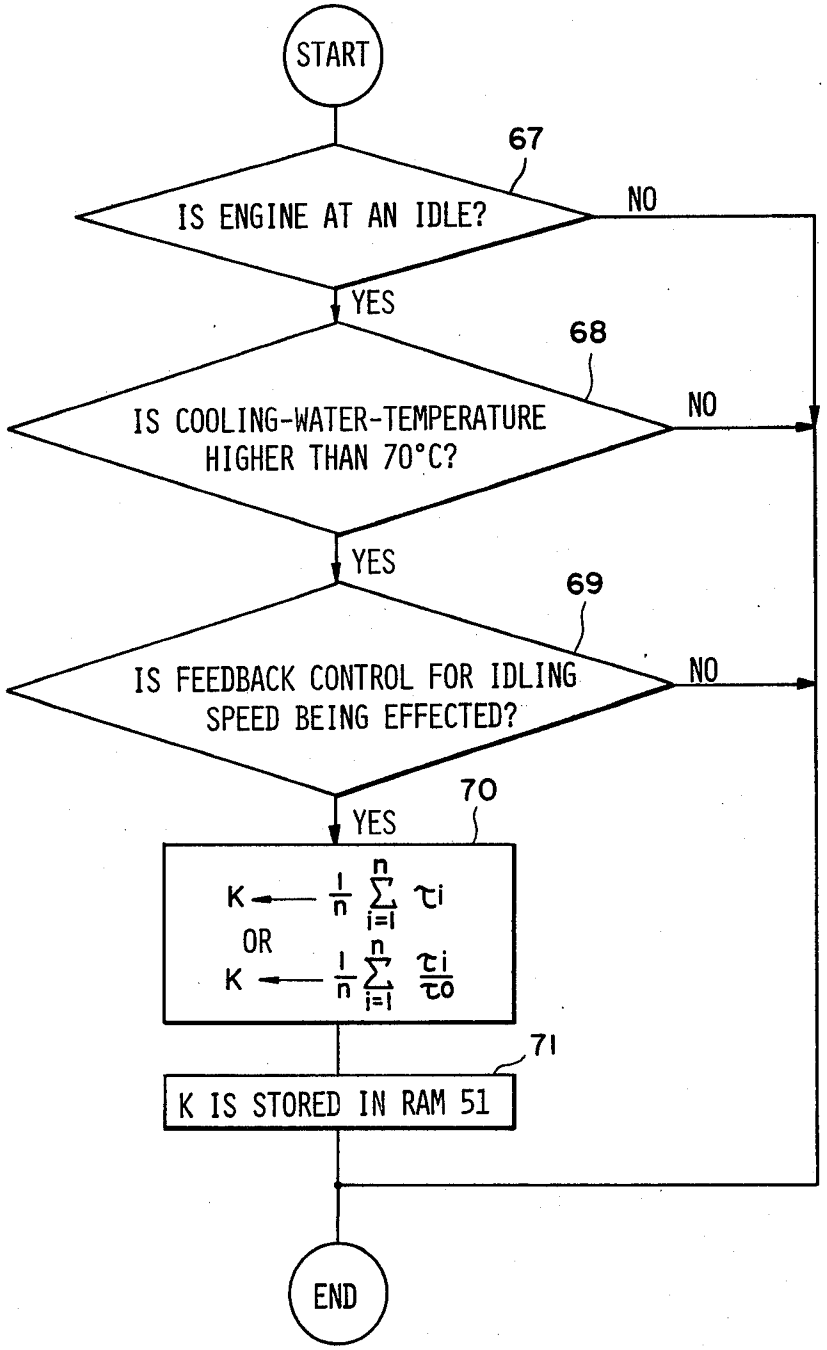
FIG. 4 is a flow chart of the program for detecting and storing values relative to a degree of friction occurring in an engine.
Figure 5:
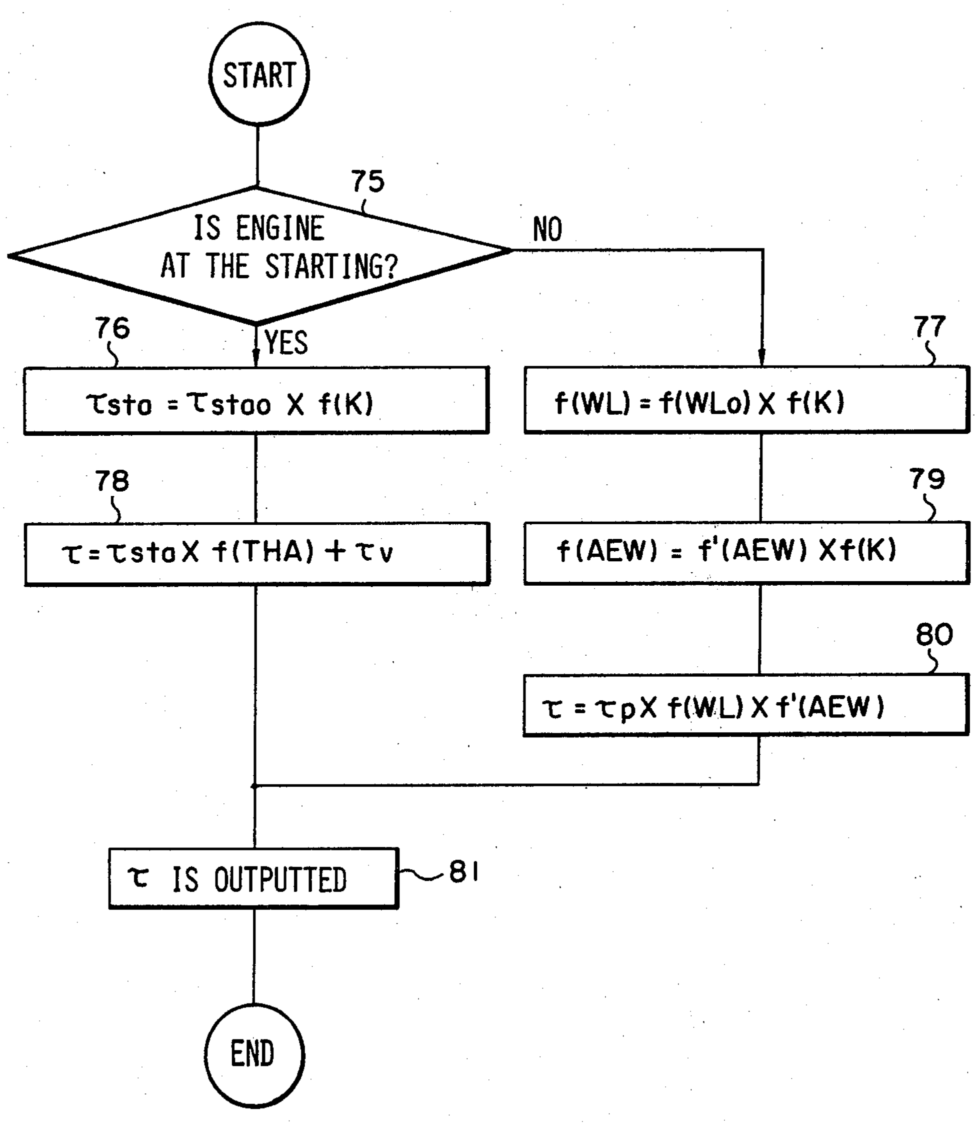
FIG. 5 is a flow chart of the program for calculating the amount of fuel being injected during starting, warm-up, or acceleration during warm-up.

FIGS. 4 and 5 are flow charts of the program according to the present invention.

By execution of the program of FIG. 4, a value K is stored in RAM 51, which value is related to either the mean value of the intake air flow rate while the the engine body 7 is warm, the engine is at an idle, and the opening of the bypass flow-rate control valve 22 is controlled to attain a desired engine running speed, or a mean value of the amount of fuel being injected which has been calculated in the electronic controlling section by using the flow rate of intake air as a parameter. At a step 67, whether or not the engine is idling is determined according to an input from the throttle position sensor 29. If the answer is YES, then the program proceeds on to a step 68, and if the answer is NO, then the program is terminated. At the step 68, a determination is made as to whether or not the engine coolant is higher than 70° C. according to an input from the coolant sensor 30. If the answer is YES, then the program proceeds on to a step 69, and if the answer is NO, then the program is terminated. At the step 69, a determination is made as to whether or not the idling speed of the engine is being feedback controlled. That is, a determination is made whether or not the opening of the bypass flow-rate control valve 22 is calculated by using the running speed of the engine as a parameter, in order to control the idling speed. If the answer is YES, then the program goes on to a step 70, and if the answer is NO, then the program is terminated. At the step 70, $$K = \frac{1}{n} \cdot \sum_{i=1}^{n} \tau i \quad \text{or} \quad K = \frac{1}{n} \cdot \sum_{i=1}^{n} \frac{\tau i}{\tau o}$$

is calculated, where "τo" is a final injection time upon termination of the break-in period, which has been selected as a typical value; "n" is a total number of pulses for a duration that meets the conditions of steps 67, 68 and 69, and "τi" is a final injection time τ at the i-th place within the aforesaid duration.

At a step 71, K is stored at RAM 51. In calculation of K, the flow rate of intake air Q may be used, in place of τ. In the latter case, $$K = \frac{1}{n} \cdot \sum_{i=1}^{n} Qi \quad \text{or} \quad K = \frac{1}{n} \cdot \sum_{i=1}^{n} \frac{Qi}{Qo},$$

where Qi is a flow rate of intake air at the i-th place, and Qo is a flow rate of intake air Q upon termination of the break-in period, which has been selected as a typical value.

In the program of FIG. 5, the amount of fuel to be injected during starting, warm-up or acceleration during warm-up is calculated by using K set and stored in the program of FIG. 4 as a parameter. At a step 75, a determination is made as to whether or no a starter is operative. If the answer is YES, then the program proceeds on to a step 76, and if the answer is NO, then the program goes on to a step 77. At the step 76, $Ysta=\tau sta o \times f(K)$ is calculated, where τsta is a basic injection time at the starting of an engine; τstao is an initial set value; f(K) is a function of K which decreases as K decreases. At a step 78, $\tau = \tau sta \times f(THA) + \tau v$ is calculated, where τ is a final injection time; f(THA) is a function of an intake air temperature THA; and τv is an ineffective injection time.

Figure 6:
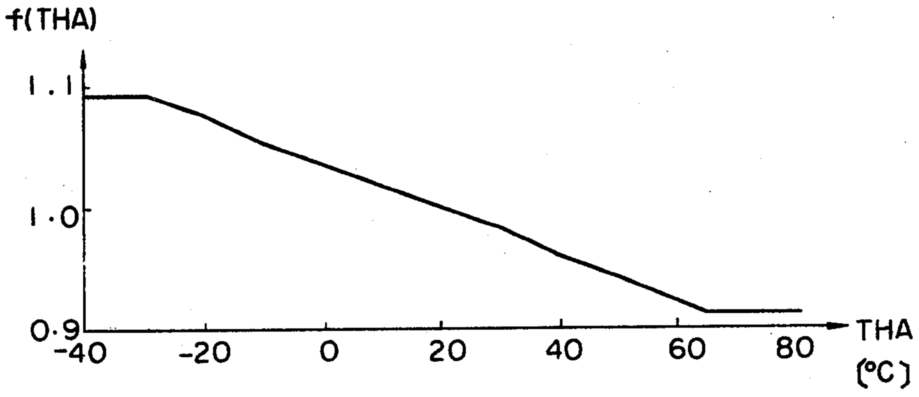
FIG. 6 is a graph indicative of the relationship of the intake air temperature versus a fuel increase coefficient.

FIG. 6 shows by way of example the relationship of f(THA) versus THA, where f(THA) increases as an intake air temperature THA becomes low. At a step 77, f(WL)×f(WLo)×f(K) is calculated, where f(WLo) is a reference fuel increase coefficient for stabilizing the running of the engine during the warming-up thereof; f(WL) is a corrected fuel increase coefficient obtained by correcting f(WLo) by f(K).

Figure 7:
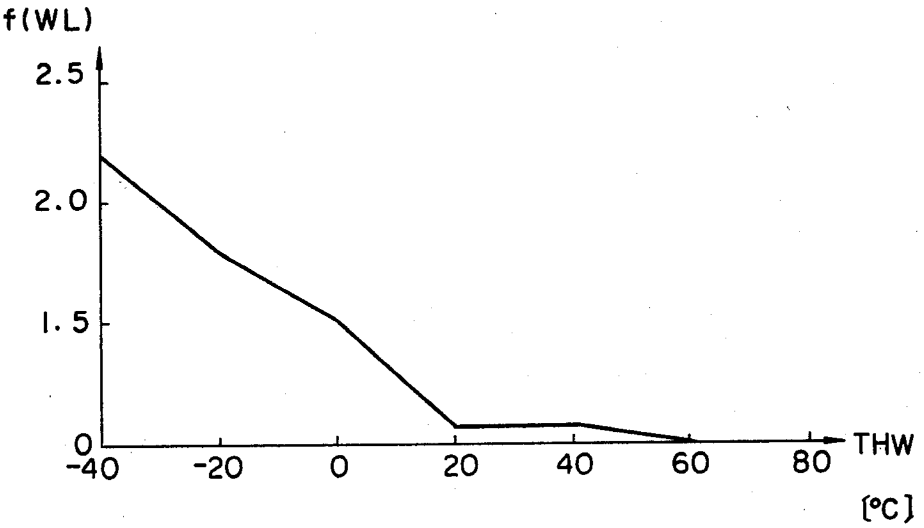
FIG. 7 is a graph indicative of the relationship of a reference fuel increase coefficient for stabilizing the running of the engine during warm-up versus the cooling water temperature.

The relationship between f(WLo) and a coolant temperature THW is shown by way of example in FIG. 7. f(WLo) increases as the coolant temperature THW drops. At a step 79, f(AEW)×f'(AEW)×f(K) is calculated, where f'(AEW) is a reference fuel increase coefficient used when the engine accelerates during warm-up and f(AEW) is a corrected fuel increase coefficient obtained by correcting f'(AEW) by f(K).

Figure 8:
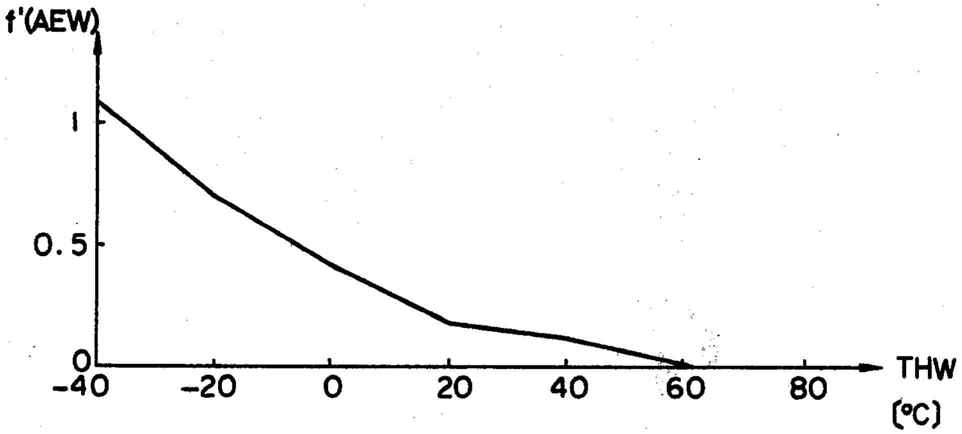
FIG. 8 is a graph indicative of the relationship of a reference fuel increase coefficient for acceleration during warm-up versus the coolant temperature.

FIG. 8 is indicative of the relationship of f'(AEW) versus THW. f'(AEW) increases as the coolant temperature THW drops. An amount of fuel being injected at the acceleration during the warming-up, of an engine, which is represented by f'(AEW), is increased, when the throttle valve 3 is turned from the opening at the idling of an engine to a wide open position by a signal from the throttle position sensor 29. At a step 80, a final injection time τ is calculated by the equation $\tau = \tau p \times f(WL) \times f'(AEW)$, where τp is a basic fuel injection time calculated by using as parameters a flow rate of intake air Ip detected by the air flow meter 2 and the rotational speed of an engine N detected by the crank angle sensor 32. At a step 81, τ is transmitted to the I/O unit 53.

As is apparent from the foregoing, according to the present invention, a value is stored related to either the mean value of the air intake flow rate when the engine is warm and its speed is being feedback controlled by the control valve during idling, or the mean value of the amount of fuel injected which has been calculated in the electronic controlling section by using the flow rate of intake air as a parameter. The aforesaid value is related to the degree of wear of the engine. The amount of fuel to be injected during restarting warm-up, or acceleration during warm-up is calculated by using the value thus stored as a parameter, so that the engine is run in an optimum condition, irrespective of engine wear.

What is claimed is:

1. A method of electronically controlling fuel injection in an engine, said engine including an intake passage; a throttle valve disposed in said passage; a fuel injection valve controlled by electric pulses for injecting fuel into said intake passage; a bypass line running in parallel to a portion of said intake passage in which said throttle valve is disposed; a control valve for controlling the effective cross sectional area of said bypass line; and an electronic controlling section for calculating from operational parameters of said engine an amount of fuel to be injected as well as a flow rate of intake air through said bypass line, thereby controlling said fuel injection valve and said control valve, said method comprising the steps of:

storing a value related to one of a mean value of an intake air flow rate while said engine is operating under first conditions in which the temperature of said engine is higher than a predetermined value, said engine is idling and the opening of said control valve is being calculated by using the rotational speed of said engine as a parameter, and a mean value of the amount of fuel that has been injected while said engine is operating under said first conditions; and calculating, by using said stored value as a parameter, an amount of fuel to be injected during at least one of the following second conditions: said engine is restarted, the temperature of said engine is lower than a predetermined value, and said engine is lower than a predetermined value, and said engine is accelerating while the temperature of said engine is lower than a predetermined value.

2. The method as defined in claim 1, wherein said amount of fuel to be injected during said at least one of said second conditions is decreased as said stored value stored is minimized.

3. The method as defined in claim 2, further comprising the step of calculating an amount of fuel to be injected when the temperature of said engine is higher than a predetermined value using an air-fuel ratio feedback signal as a parameter.

4. The method as defined in claim 3, wherein said amount of fuel to be injected during at least one of said second conditions is calculated without using said air-fuel ratio feedback signal as a parameter.

5. The method as defined in claim 4, wherein said stored value is related to a pulse width of a fuel injection pulse.

6. The method as defined in claim 5, wherein said second conditions injection amount calculating step during engine restarting includes the steps of:

correcting a predetermined basic injection timing by said stored value; and calculating an amount of fuel to be injected at that instant by using the result of said correcting step as a parameter.

7. The method as defined in claim 5, wherein said second conditions injection amount calculating step during engine warm-up includes the steps of:

correcting a first function, whose value decreases as the temperature of said engine rises, by said stored value, thereby obtaining a first reference fuel increase coefficient; and calculating an amount of fuel to be injected by using said first reference fuel increase coefficient as a parameter.

8. The method as defined in claim 7, wherein said second conditions injection amount calculating step during acceleration while the engine is warming up includes the steps of:

correcting a second function whose value decreases as the temperature of said engine is elevated by said stored value, thereby obtaining a second reference fuel increase coefficient; and calculating the amount of fuel to be injected by using said first and second reference fuel increase coefficients as parameters.

9. Apparatus for electronically controlling fuel injection in an engine, said engine having an intake passage, and a throttle valve disposed in said passage and a fuel injection valve controlled by electric pulses for injecting fuel into said intake passage, said apparatus comprising:

a bypass line running in parallel to a portion of said intake passage in which said throttle valve is disposed;

a control valve for controlling the effective cross sectional area of said bypass line; and electronic control means for: (1) adjusting, when said engine is warm and is idling, the rotational speed of said engine to a desired value by controlling said control valve, (2) calculating from operational parameters of said engine in an amount of fuel to be injected during first conditions in which the temperature of said engine is higher than a predetermined value, said engine idling and the opening of said throttle valve is being controlled by using the rotational speed of said engine as a parameter, (3) storing a value related to one of a mean value of an intake air flow rate while said engine is operating under said first conditions, and a means value of the amount of fuel that has been injected while said engine is operating under said first conditions, and (4) calculating, by using said stored value as a parameter, an amount of fuel to be injected during at least one of the following second conditions: said engine is restarting, the temperature of said engine is lower than a predetermined value, and said engine is accelerating while the temperature of said engine is lower than a predetermined value.

10. The apparatus as defined in claim 9 wherein said electronic controlling means decreases said amount of fuel to be injected during said at least one of said second conditions as said stored value is minimized.

11. Apparatus as defined in claim 10 wherein said electronic controlling means calculates an amount of fuel to be injected when the temperature of said engine is higher than a predetermined value using an air-fuel ratio feedback signal as a parameter.

12. Apparatus as defined in claim 11 wherein said electronic controlling means calculates said amount of fuel to be injected during at least one of said second conditions without using said air-fuel ratio feedback signal as a parameter.

13. Apparatus as defined in claim 12 wherein said stored value is related to a pulse width of a fuel injection pulse.

14. Apparatus as defined in claim 13, wherein said electronic controlling means calculates said second conditions injection amount by correcting a predetermined basic injection timing by said stored value, and calculates an amount of fuel to be injected at that instant by using the result of said correcting step as a parameter.

15. Apparatus as defined in claim 13, wherein said electronic controlling means calculates said second conditions injection amount during engine warm-up by correcting a first function, whose value decreases as the temperature of said engine rises, by said stored value, thereby obtaining a first reference fuel increase coefficient, and calculating an amount of fuel to be injected by using said first reference fuel increase coefficient as a parameter.

16. Apparatus as defined in claim 15, wherein said electronic controlling means calculates said second conditions injection amount during acceleration while the engine is warming up by correcting a second function, whose value decreases as the temperature of said engine is elevated, by said stored value, thereby obtaining a second reference fuel increase coefficient, and calculating an amount of fuel to be injected by using said first and second reference fuel increase coefficients as parameters.

* * * * *